United States Patent
Woodman et al.

[15] 3,638,698
[45] Feb. 1, 1972

[54] CROSSLINKED CARBOXYMETHYL CELLULOSE NITRATES PROPELLANTS

[72] Inventors: Alan L. Woodman; Arnold Adicoff, both of China Lake, Calif.

[73] Assignee: The United States of America as represented by the Secretary of the Navy

[22] Filed: Sept. 30, 1966

[21] Appl. No.: 584,059

[52] U.S. Cl. .................................. 149/2, 149/93, 149/100, 264/3
[51] Int. Cl. ........................................ C06c 5/02, C06d 5/06
[58] Field of Search ..................... 149/93, 94, 92, 96, 18, 19, 149/38, 2, 100; 264/3

[56] References Cited

UNITED STATES PATENTS 3,477,888   11/1969   Yanagisawa ............................. 149/18

*Primary Examiner*—Benjamin R. Padgett
*Attorney*—G. J. Rubens, Roy Miller and Victor C. Muller

EXEMPLARY CLAIM

1. The composition consisting essentially of carboxymethyl cellulose nitrate, pentaerythritol trinitrate, ethyl centralite, and a cross-linking agent selected from the group consisting of ethylene bis(2-metyl-1-aziridine carboxylate), tris(2-methyl-1-aziridinyl)phosphine oxide, bisphenol A-epichlorohydrin diepoxide, and a mixture composed of butyl glycidyl ether and bisphenol-epichlorohydrin diepoxide.

6 Claims, No Drawings

CROSSLINKED CARBOXYMETHYL CELLULOSE NITRATES PROPELLANTS

The present invention relates to a method for preparing cross-linked carboxymethyl cellulose nitrate and to the product thereof.

Cellulose nitrate has long been used in the propellant industry. In the past diisocyanates have been used to cross-link cellulose nitrate to improve the tensile properties. Isocyanates are very sensitive to moisture with which they react to form carbon dioxide. Therefore, propellant ingredients must be thoroughly dried before mixing in the diisocyanate to prevent the formation of bubbles. The present invention provides an improved cellulose nitrate which can be readily used in propellant binders with ingredients that are less sensitive to moisture than the earlier art and which does not yield gaseous products upon hydrolysis.

It is therefore an object of the present invention to provide a method for preparing a cross-linked cellulose nitrate which has improved chemical and physical properties for use in propellant binders.

Another object is to provide a cross-linked composition which when used as a propellant grain ingredient will improve the sag and slump properties on storage of the grain.

Still another object is to provide a means for producing cross-linked carboxymethyl cellulose nitrate which is simple and economical.

Other objects, features and many of the attendant advantages of this invention will become readily appreciated as the same become better understood by reference to the following detailed description.

Carboxymethylcellulose nitrate can be represented by the general formula

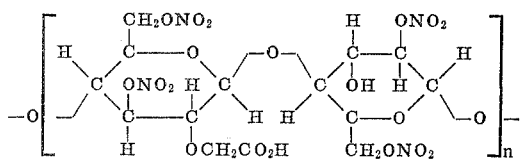

The degree of substitution n of carboxymethyl groups per anhydroglucose unit which leads to a useable product for propellant ingredients ranges from 0.05 to 0.25. The remainder of the hydroxyl groups of the cellulose may be replaced completely by nitrate groups. In accordance with the present invention cross-linking was achieved by using compounds which react with the carboxyl groups such as polyfunctional epoxides and aziridines.

The following examples are given by way of illustration and not by way of limitation.

EXAMPLE 1

Carboxymethyl cellulose nitrate cross-linked with an aziridine

A solution was prepared consisting of 0.8030 grams of carboxymethyl cellulose nitrate (having a degree of substitution of 0.21 carboxymethyl groups, %N=12.79) dissolved in 25 ml. of acetone. To this solution was added 2.1035 grams of the plasticizer, pentaerythritol trinitrate, 0.0420 grams of the stabilizer, ethyl centralite, and 0.0605 grams of the cross-linking agent, ethylene bis(2-methyl-1-aziridine carboxylate). The solution was poured into an aluminum dish and the acetone allowed to evaporate under a slow stream of air at room temperature. After 1½ to 2 days elapsed the film was cured for 3 days at 60–65° C. The cured film was very flexible, gave no indication of plasticizer bleed-out, and was insoluble in acetone.

Using the same process films were prepared using tris-(2-methyl-1-aziridinyl)phosphines oxide, DER 332, which is the trade name for a bisphenol A-epichlorohydrin diepoxide produced by Dow Chemical Company, and TC 459A, a product from Electronic Production and Development Corporation, which consists of a mixture of butyl glycidyl ether and bisphenol A-epichlorohydrin diepoxide. The films containing the diepoxides were cured at 45–50° C. for 4 days.

Similar cross-linked films were prepared using a carboxymethyl cellulose nitrate with a degree of substitution of 0.07 and nitrogen content of 14.02 percent.

All of the films prepared were clear and flexible and were insoluble in solvents for cellulose nitrate.

EXAMPLE II

Plasticized cross-linked cellulose nitrate

A mixture consisting of 11 grams trimethylol ethane trinitrate, 9 grams triacetin, 7.4 grams carboxymethyl cellulose nitrate (degree of substitution of 0.05, %N=13.8) in the plastisol form (which contains approximately 5 percent ethyl centralite as stabilizer), 0.125 gram ethylene bis(2-methyl-1-aziridine carboxylate), 20.5 grams ammonium perchlorate (180μ) and 2 grams aluminum (20μ) were blended together at room temperature under vacuum. After being cured for 4 days at about 55° C., the product was a tough, rubber propellant which neither dissolved nor disintegrated in acetone. This is a plastisol-type material. The cross-linking agents are introduced in the swelling plasticizer in such a fashion that a castable fluid mix which can be poured or extruded is formed. This mixture can be further treated by means of elevated temperature or prolonged storage to give an elastomeric matrix that is a plasticized, cross-linked cellulose nitrate.

Obviously many modifications and variations of the present invention are possible in the light of the above teachings. It is therefore to be understood that within the scope of the appended claims the invention may be practiced otherwise than as specifically described.

What is claimed is:

1. The composition consisting essentially of carboxymethyl cellulose nitrate, pentaerythritol trinitrate, ethyl centralite, and a cross-linking agent selected from the group consisting of ethylene bis(2-methyl-1-aziridine carboxylate), tris(2-methyl-1-aziridinyl)phosphine oxide, bisphenol A-epichlorohydrin diepoxide, and a mixture composed of butyl glycidyl ether and bisphenol-epichlorohydrin diepoxide.

2. The composition according to claim 1 in which the cross-linking agent is ethylene bis(2-methyl-1-aziridine carboxylate).

3. The composition according to claim 1 in which the cross-linking agent is tris(2-methyl-1-aziridinyl)phosphine oxide.

4. The composition according to claim 1 in which the cross-linking agent is bisphenol A-epichlorohydrin diepoxide.

5. A method for the preparation of the composition according to claim 1 which comprises
   a. forming a solution of carboxymethyl cellulose nitrate in acetone
   b. stirring into said solution pentaerythritol trinitrate, ethyl centralite and a member selected from the group consisting of ethylene bis(2-methyl-1-aziridine carboxylate), tris(2-methyl-1-aziridinyl)phosphine oxide, bisphenol A-epichlorohydrin diepoxide and a mixture consisting essentially of butyl glycidyl ether and bisphenol-epichlorohydrin diepoxide to form a mixture;
   c. removing the acetone from said mixture by evaporation;
   d. curing the resulting product for up to about 5 days at temperatures ranging from 45°–65° C. until a flexible film forms.

6. A method for the preparation of plasticized cross-linked carboxymethyl cellulose which comprises
   a. mixing carboxymethyl cellulose nitrate in the plastisol form, trimethylol ethane trinitrate, triacetin and bis(2-methyl-1-aziridine carboxylate) to form a slurry; and
   b. curing said slurry until a solid material is formed.

* * * * *